United States Patent [19]

Ranf et al.

[11] Patent Number: 4,727,414

[45] Date of Patent: Feb. 23, 1988

[54] CIRCUIT FOR CONVERTING DIGITAL SIGNALS REPRESENTING COLOR INFORMATION INTO ANALOG VOLTAGE LEVEL SIGNALS WITH ENHANCED CONTRAST BETWEEN FOREGROUND AND BACKGROUND

[75] Inventors: Karl H. Ranf, Friedberg; Wolfgang Laupheimer, Lindenberg, both of Fed. Rep. of Germany

[73] Assignee: NCR Corporation, Dayton, Ohio

[21] Appl. No.: 887,159

[22] PCT Filed: Dec. 5, 1985

[86] PCT No.: PCT/US85/02391

§ 371 Date: Jun. 18, 1986

§ 102(e) Date: Jun. 18, 1986

[87] PCT Pub. No.: WO86/03614

PCT Pub. Date: Jun. 19, 1986

[30] Foreign Application Priority Data

Dec. 7, 1984 [GB] United Kingdom ................. 8431038

[51] Int. Cl.[4] ........................ H04N 9/67; H04N 5/20; G09G 3/00

[52] U.S. Cl. ...................................... 358/30; 358/166; 340/793

[58] Field of Search ..................... 358/30, 37, 166, 10, 358/282; 340/703, 704, 793

[56] References Cited

U.S. PATENT DOCUMENTS

| | | | |
|---|---|---|---|
| 4,236,175 | 11/1980 | Groothius | 358/30 |
| 4,251,755 | 2/1981 | Bryden | 340/793 |
| 4,274,094 | 6/1981 | Noguchi | 340/793 |
| 4,481,529 | 11/1984 | Kerling | 358/30 |
| 4,626,835 | 12/1986 | Nienaber et al. | 340/703 |
| 4,688,031 | 8/1987 | Haggerty | 340/793 |

*Primary Examiner*—James J. Groody
*Assistant Examiner*—Robert M. Bauer
*Attorney, Agent, or Firm*—Wilbert Hawk, Jr.; Casimer K. Salys

[57] ABSTRACT

Circuit for converting digital signals representing color information into analog voltage level signals applied to a monochrome CRT monitor. Digital signals representing color information are applied to first ends of a plurality of resistors (R1 to R4) the other ends of which are connected to a common point (32). The voltage output appearing at the common point (32) determines the analog voltage level signals for application to the monitor. A signal indicative of whether foreground information or background is to be displayed is applied to one end of a further resistor (R5) the other end of which is connected to the common point (32). The value of the further resistor (R5) is so chosen that a relative shift is brought about between the voltage range of the analog signals relating to foreground information and that of the analog signals relating to background, whereby enhanced contrast between foreground information and background is achieved.

3 Claims, 5 Drawing Figures

0 = BLACK
1 = BLUE
2 = GREEN
3 = CYAN
4 = RED
5 = MAGENTA
6 = BROWN
7 = WHITE

8 = GREY
9 = LIGHT BLUE
10 = LIGHT GREEN
11 = LIGHT CYAN
12 = LIGHT RED
13 = LIGHT MAGENTA
14 = YELLOW
15 = INTENSE WHITE

CIRCUIT FOR CONVERTING DIGITAL SIGNALS REPRESENTING COLOR INFORMATION INTO ANALOG VOLTAGE LEVEL SIGNALS WITH ENHANCED CONTRAST BETWEEN FOREGROUND AND BACKGROUND

FIELD OF THE INVENTION

This invention relates to circuit means for converting digital signals representing color information into analog voltage level signals to be applied to a monochrome CRT monitor for displaying information generated by a data processing system. The invention has application, for example, to the display monitor of a personal computer.

DESCRIPTION OF THE RELATED ART

CRT monitors display information in the form of text and/or graphics (hereinafter referred to as foreground information) against a background which may be uniform over the CRT screen. With color CRT monitors, an attribute register supplies digital data representing color information (red, green, blue or combinations thereof, with or without an intensity component) for foreground and background channels to a multiplexer The multiplexer output is applied to the color CRT as the normal RGBI signal. Some personal computers, for example, may be supplied with either a color or a monochrome CRT monitor, at the option of a customer. However, it is desirable that such computers should utilize the same software regardless of whether they have a color or a monochrome CRT monitor, and accordingly the monitor of such a computer may utilize input data representing color information even if the monitor is a monochrome CRT. If colored information is to be displayed on a monochrome CRT, each color must be converted by a digital-to-analog converter to an analog voltage representing a step in a grey scale.

A problem arising with monochrome monitors utilizing input data representing color information is that the contrast between the grey scale values for foreground information and background may be rather poor for certain color combinations, e.g. blue on black.

SUMMARY OF THE INVENTION

Thus, it is an object of this invention to provide circuit means for use with a monochrome CRT monitor which alleviates the problem referred to above.

According to the invention, there is provided circuit means for converting digital signals representing color information into analog voltage level signals for application to a monochrome CRT monitor, characterized by a resistor network to which said digital signals are applied in operation, said resistor network being arranged to generate a voltage output in response to said digital signals, said voltage output determining the analog voltage level signals for application to said monitor, and by further resistor means to which is applied in operation a further digital signal indicative of whether foreground information or background is to be displayed, said further resistor means being operatively connected to said resistor network and the value of said further resistor means being so chosen that a relative shift is brought about between the voltage range within which said analog voltage level signals lie when foreground information is to be displayed and the voltage range within which said analog voltage level signals lie when background is to be displayed, said shift being in such a sense as to enhance the contrast between foreground information and background.

BRIEF DESCRIPTION OF THE DRAWINGS

Embodiments of the invention will now be described, by way or example, with reference to the accompanying drawings, in which.

DESCRIPTION OF THE PREFERRED EMBODIMENTS

Figure 1:
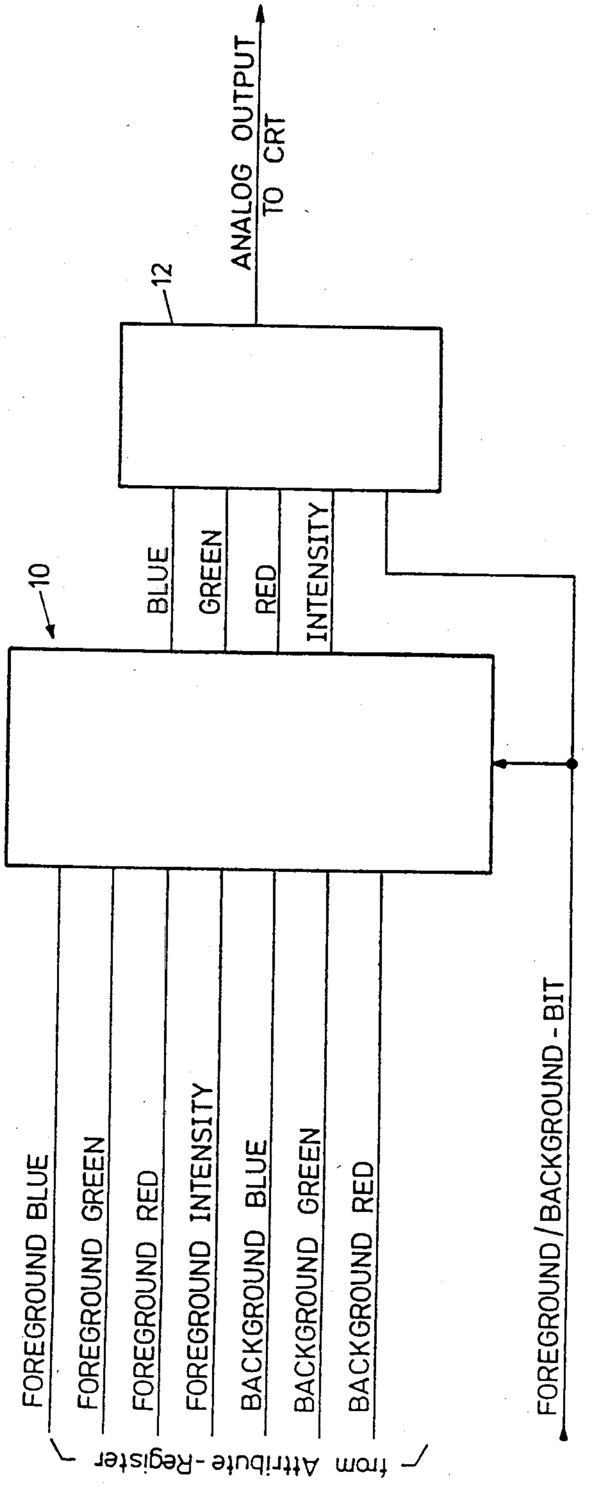
FIG. 1 is a block diagram of input circuitry for a monochrome CRT monitor, including circuit means according to the present invention.

Referring to FIG. 1, color attribute signals from an attribute register are shown as inputs to a multiplexer 10. The three color signals for both the foreground information and the background as well as an intensity signal for the foreground information are combined with character information signals supplied by a character generator (not shown). Table 1 below shows the bit combinations for 8 simple colors (used for both the foreground information and the background) and 8 colors of high intensity (used for the foreground information only) composed of the three basic colors supplied to and outputted from the multiplexer 10.

TABLE 1

| | INTENSITY | RED | GREEN | BLUE |
|---|---|---|---|---|
| Black | 0 | 0 | 0 | 0 |
| Blue | 0 | 0 | 0 | 1 |
| Green | 0 | 0 | 1 | 0 |
| Cyan | 0 | 0 | 1 | 1 |
| Red | 0 | 1 | 0 | 0 |
| Magenta | 0 | 1 | 0 | 1 |
| Brown | 0 | 1 | 1 | 0 |
| White | 0 | 1 | 1 | 1 |
| Grey | 1 | 0 | 0 | 0 |
| Light Blue | 1 | 0 | 0 | 1 |
| Light Green | 1 | 0 | 1 | 0 |
| Light Cyan | 1 | 0 | 1 | 1 |
| Light Red | 1 | 1 | 0 | 0 |
| Light Magenta | 1 | 1 | 0 | 1 |
| Yellow | 1 | 1 | 1 | 0 |
| Intense White | 1 | 1 | 1 | 1 |

The multiplexer 10 functions as a switch controlled by a foreground/background bit signal supplied by the character generator.

Figure 2:
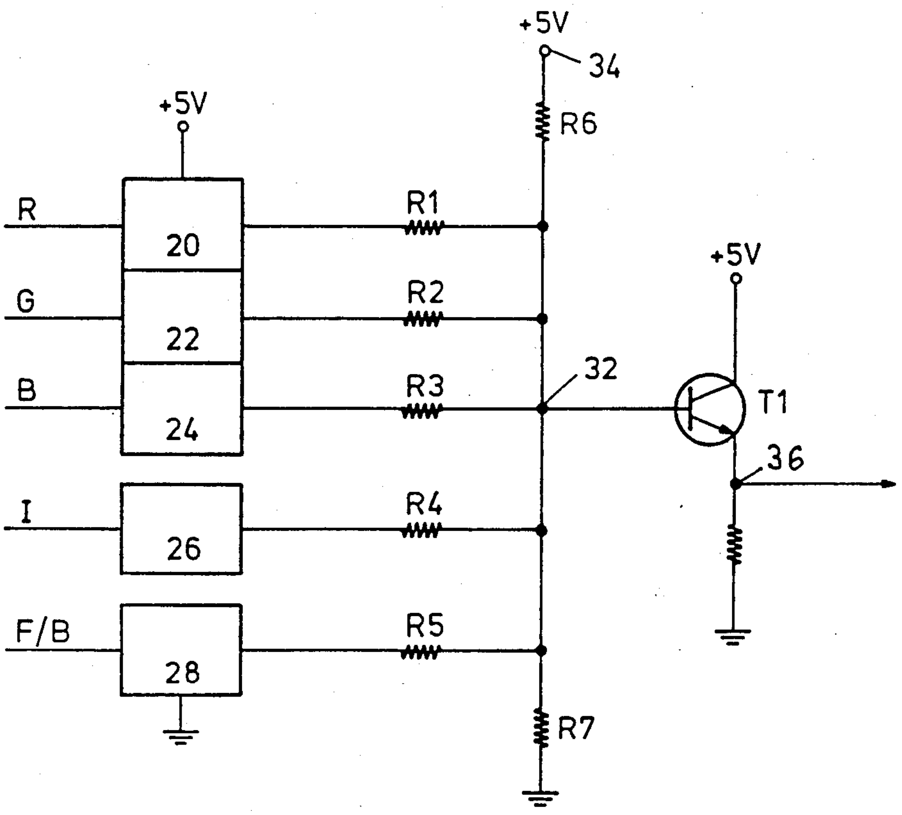
FIG. 2 is a more detailed diagram of the circuit means according to the present invention.

The color and intensity signals outputted from the multiplexer 10 are applied to a digital-to-analog converter 12 shown in more detail in FIG. 2, the output of the converter 12 being applied to a monochrome CRT monitor (not shown). The converter 12 includes five digital buffers 20, 22, 24, 26 and 28, to the inputs of which are respectively provided digital signals representing the colors red, green and blue, an intensity signal and the foreground/background bit signal. The outputs of the buffers 20 to 28 are respectively connected through resistors R1 to R5 to a common point 32 which is connected to the base of a transistor T1. The point 32 is connected to a voltage supply source 34 via a resistor R6 and to ground via a resistor R7.

During operation, the resistors R6 and R7 set a certain DC voltage at the base of the transistor T1. The corresponding output voltage at the emitter of the transistor T1 is always about 0.7 V below the base voltage. When the output of any buffer is switched from a low level (0 V) to a high level (5 V) or vice versa, the respective one of the series resistors R1 to R5 alters the voltage level at the common point 32. A high level output of a buffer supplies a current into the base of transistor T1 via the respective series resistor, and a low level output diverts current from the base to ground. The values of the resistors R1 to R3 are chosen in an approximate binary ratio 1:2:4 which provides a voltage at the base of the transistor T1 which is substantially proportional to the binary values of the RGB inputs shown in table 1.

The voltage appearing at a point 36 connected to the emitter of the transistor T1 represents the analog output of the converter 12, this output being applied to the monochrome CRT monitor. Each output voltage appearing at the point 36 lies on a linear grey scale. By adding the resistor R4 connected between the buffer 26 and the common point 32, it is possible to shift the linear grey scale to a higher level (if the intensity signal is true) or to a lower level (if the intensity signal is false). The value of resistor R4 is chosen to generate two overlapping grey scales as shown on the left hand side of FIG. 3 to be explained hereafter.

The resistor R5 is controlled by the foreground-/background bit whose level at any instant is indicative of whether foreground information or background is to be displayed. The value of the resistor R5 is chosen so that this resistor has a significant influence on the output voltage of the network. If the foreground/background signal changes from a low level (indicative of background) to a high level (indicative of foreground information), the current entering the base of transistor T1 is increased considerably so that the whole grey scale is shifted upwards to the highest level useful for CRT display. If the foreground/background signal changes from a high level to a low level, part of the transistor base current is diverted to ground which results in the whole grey scale being shifted downwards until reaching the black level of the CRT monitor. The value of the resistor R5 is so chosen that the two resulting grey scale ranges are shifted relative to one another in such a sense as to enhance the contrast between foreground information and background and such that the lowest voltage level of the higher range is above the highest voltage level of the lower range. This results in a separation between the foreground and background voltage ranges and provides at least a minimum contrast between the two as will be explained in connection with FIG. 3.

For practical purposes, a useful range for the values of resistors R1 to R5 can be chosen as follows:

| | |
|---|---|
| R1 | 1k |
| R2 | 2.2k |
| R3 | 4.3k |
| R4 | 1.5k |
| R5 | 390 ohms |
| R6 | 470 ohms |
| R7 | 1k |

Figure 3:
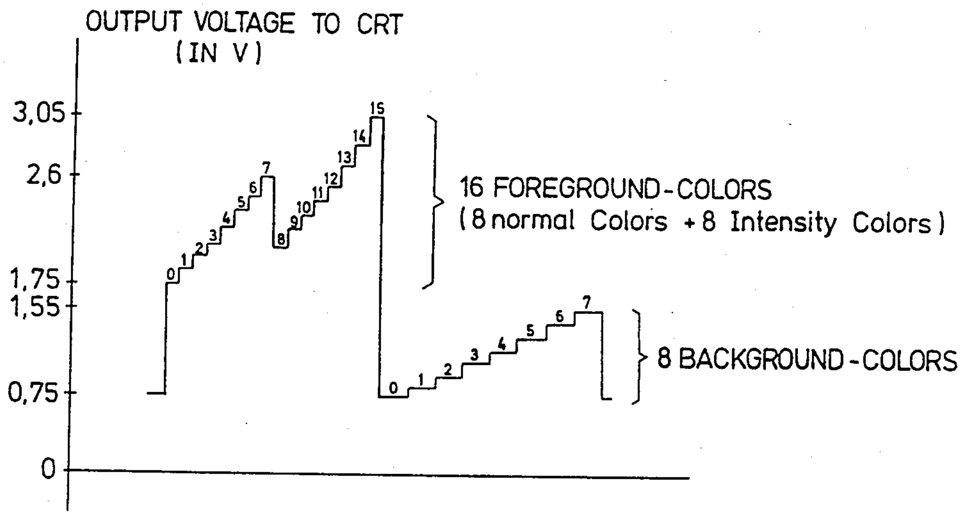
FIG. 3 is a diagram showing the foreground and background colors expressed as voltage levels appearing at the output of a digital-to-analog converter.

The voltage output of the digital-to-analog converter 12 represents the various bit combinations for the foreground and background colors as shown in FIG. 3. The bit combinations for the eight background colors are represented by the voltage range extending from 0.75 to 1.55 V, while the voltage range for the bit combinations for the 16 foreground colors is shifted according to the invention to extend from 1.75 to 3.05 V, whereby there is no overlap between the voltage ranges for the foreground and the background. This ensures an adequate contrast between adjacent grey scale values representing any color combination.

Figure 4:
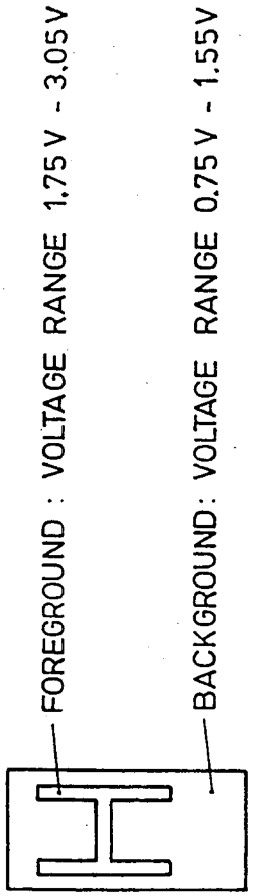
FIG. 4 is an illustration of a character showing the voltage ranges of FIG. 3 for the foreground and background.

The voltage ranges for the bit combinations for the foreground and background colors are also shown in FIG. 4 illustrating the character "H" in its associated character field.

Figure 5:
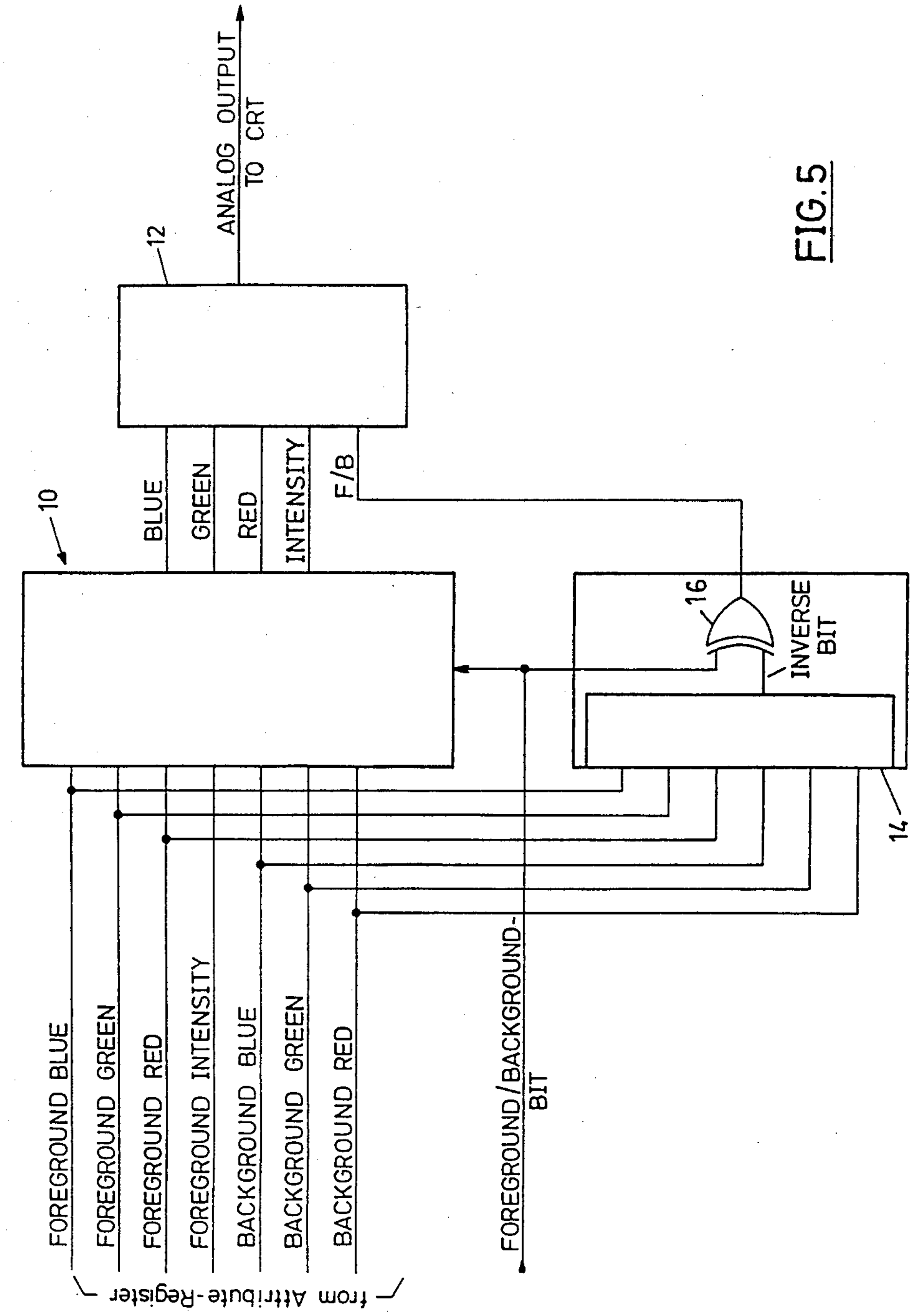
FIG. 5 is a block diagram of a modified version of the input circuitry shown in FIG. 1, showing an inverse logic decoder.

While there is no overlap between the voltage ranges representing the lightest background colors and the darkest foreground colors, ensuring adequate contrast, it may be desirable to display dark characters on a light background as is usual with inverse video display techniques. This may be achieved with the circuit means according to the present invention by providing an inverse logic decoder 14 as shown in FIG. 5. The signals representing the color attributes for both foreground and background are applied to this decoder 14 whose output, together with the foreground/background bit signal, is applied to an exclusive-OR gate 16. If the output of the decoder 14 is true, then the output of the gate 16 will be the inverse of the foreground-/background bit signal. On the other hand, if the output of the decoder 14 is false, the foreground/background signal will remain unchanged. The output of gate 16 is applied as the foreground/background bit signal or foreground/background/inverse signal to the digital-to-analog converter 12. Thus, if the output of the decoder 14 is true, this brings about an inversion of the voltage levels shown in FIG. 3, i.e. the background will have the voltage range extending from 1.75 to 2.6 V, and a black foreground color will be represented by the voltage level 0.75 V. A grey foreground color will be represented by a voltage level of about 1 V.

We claim:

1. Circuit means for converting digital signals representing color information into analog voltage level signals for application to a monochrome CRT monitor, characterized by a resistor network (R1 to R4) to which said digital signals are applied during operation, said resistor network (R1 to R4) being arranged to generate a voltage output in response to said digital signals, said voltage output determining the analog voltage level signals for application to said monitor, and by further resistor means (R5) to which is applied during operation a further digital signal indicative of whether foreground information or background is to be displayed, said further resistor means (R5) being operatively connected to said resistor network (R1 to R4) and the ohmic value of said further resistor means (R5) being so chosen that a relative shift is brought about between the voltage range within which said analog voltage level signals lie when foreground information is to be displayed and the voltage range within which said analog voltage level signals lie when the background is to be displayed, said shift being in such a sense as to enhance the contrast between foreground information and the background.

2. Circuit means according to claim 1, characterized in that the value of said further resistor means (R5) is so chosen that the voltage range within which said analog voltage level signals lie when foreground information is to be displayed does not overlap the voltage range within which said analog voltage level signals lie when the background is to be displayed.

3. Circuit means according to either claim 1 or claim 2, characterized in that said digital signals applied in operation to said resistor network (R1 to R4) are respectively applied to first ends of a plurality of resistors, the opposite ends of which are connected to a common point (32), said common point (32) constituting an intermediate point of a resistive chain across which a DC voltage is applied in operation, and the voltage appearing during operation at said common point (32) forming the input to a transistor circuit (T1), from the output of which are obtained said analog voltage level signals, and wherein one end of said further resistor means (R5) is connected to said common point (32), said further digital signal being applied in operation to the other end of said further resistor means (R5).

* * * * *